Patented July 21, 1936

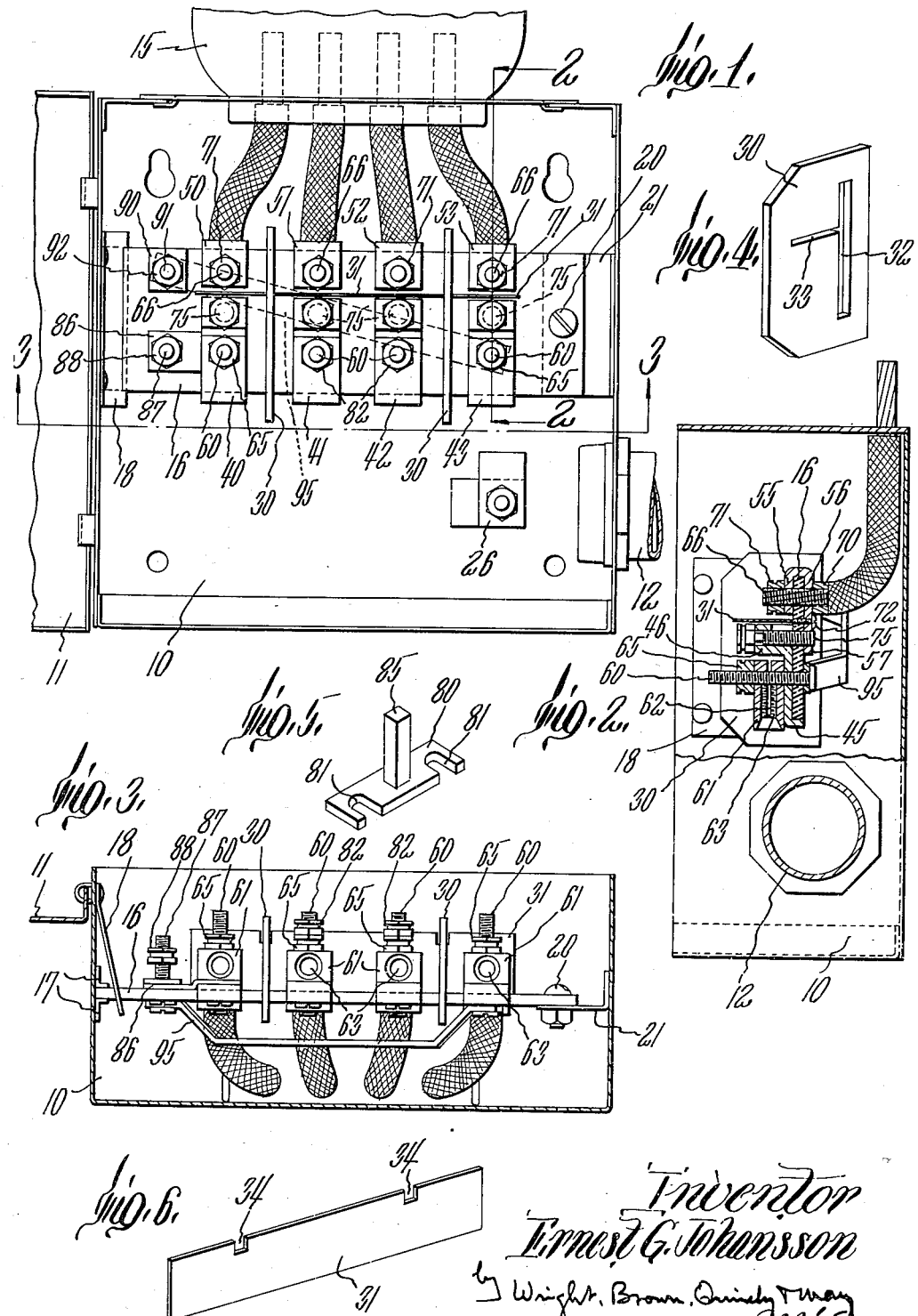

2,048,007

UNITED STATES PATENT OFFICE 2,048,007

METER TEST BLOCK

Ernest G. Johansson, Watertown, Mass., assignor to The Palmer Electric & Manufacturing Co., Waltham, Mass., a corporation of Massachusetts Application March 6, 1934, Serial No. 714,297

8 Claims. (Cl. 175—183)

This invention relates to a meter test-block and means for mounting the block in a meter terminal housing.

For various reasons there is a present day demand for meter terminal housings occupying the smallest possible space. Definite limitations are placed upon the minimum dimensions of such a housing by the underwriters' requirements. The rules require that there shall be between current-carrying conductors of different polarity a prescribed minimum distance through the air and a prescribed minimum surface distance on the insulating member carrying the conductors. It is an object of the invention to provide a meter terminal housing containing a test-block, the housing being of the smallest possible dimensions consistent with the underwriters' requirements, and the test-block being of simple and convenient structure capable of rapid and economical manufacture. It is a further object of the invention to provide the test-block with novel bridging conductors which normally connect pairs of terminals on the block and which may be operated to break these connections, the arrangement and materials being such that, in case any considerable current is flowing through a bridging conductor at the time of such a break, the resultant arc will be immediately quenched.

For a more complete understanding of the invention, reference may be had to the description of an embodiment which follows and to an illustration thereof on the drawing, of which Figure 1 is a front elevation of a meter terminal housing and test-block embodying the invention.

Figure 2 is a section on the line 2—2 of Figure 1.

Figure 3 is a section on the line 3—3 of Figure 1.

Figure 4 is a perspective view of the barrier member forming a part of the test-block shown in Figure 1.

Figure 5 is a perspective view of a temporary connecter or jumper which may be used on the test-block when testing the meter.

Figure 6 is a perspective view of another barrier member forming a part of the test-block.

Figure 1 illustrates in elevation a meter terminal housing 10, which may be constructed, as usual, of sheet iron suitably stamped and shaped. This box or housing is preferably provided with a cover 11 hinged thereto. The box wall may be provided with an opening to receive a pipe or conduit 12 through which the line and load lead wires may enter the box. A portion of a meter is indicated at 15. Within the box 10 a test-block is mounted. The test-block, as shown, may comprise a base 16 consisting of a rectangular slab of insulating material such as vulcanized fiber. This material is not only capable of being punched, drilled and tapped easily and accurately, but also has the property of giving off arc-quenching gases when strongly heated. Advantage may be taken of the latter characteristic as is hereinafter explained. As indicated in Figure 3, the test-block may conveniently be mounted in the housing 10 by means of a pair of brackets 17 mounted on a side wall of the box to form an elongated channel adapted to receive one end of the slab 16. A sheet of insulation 18 is preferably secured to the same side wall of the box, this sheet being provided with an elongated slot alined with the channel between the brackets 17 so that the slab 16 passes through the slot in the sheet 18 to engage the channel between the brackets 17. The opposite end of the slab 16 is fastened as by a bolt 20 to a bracket 21 mounted on the adjacent wall of the box. Thus the test-block can be easily and quickly mounted in place in the box or removed therefrom. As hereinafter described, the test-block includes conductors adapted to connect with the wires leading to the line and the load. A connecter 26 may be provided for neutral or ground wires, this connecter being secured at a convenient point to the rear wall of the box 10.

In making the test-block shown on the drawing, suitable holes may be formed by punching, drilling, or otherwise, in the slab 16 to receive bolts or equivalent fastening elements. These holes may be formed rapidly and economically by rapid process tools. In order to provide for the proper spacing between current-carrying parts of different polarity, I provide barrier elements which are suitably located between such parts. According to the invention, such barrier elements are pre-formed and are assembled with the slab 16 after the holes are formed therein but before the conductors are mounted thereon. Suitable barrier elements are illustrated in Figures 4 and 6, Figure 4 showing a transverse barrier 30 and Figure 6 showing a longitudinal barrier 31. Each transverse barrier 30 consists of a sheet or slab of insulating material having an elongated slot 32 formed therein, this slot being substantially the same size and shape as the cross section of the slab 16 so that the slab may be inserted through the slot 32 for a driving fit. Each barrier member 30 is also provided with another slot 33 at right angles to the slot 32, the slot 33 having a width equal to the thickness of the longitudinal barrier 31. This barrier is notched as at 34 so as to form mortised joints with the barriers 30 when the barrier 31 is forced through the slots 33. In assembling the base and barriers, the barrier 31 is forced through the slots 33 of the barriers 30 and is then moved forwardly so that the bottom of the notches 34 seat against the ends of the slots 33. A slab 16 is then forced through the slots 32 of the barriers 30, the parts fitting tightly in the slots so that the assembled structure is rigid. The barriers are adjusted to positions relative to the holes in the base 16, as indicated in Figure 1.

The conductors are then assembled with the base and barriers. As shown, a set of lower conductors 40, 41, 42 and 43 is provided, each of these conductors, as illustrated in Figure 2, having an end portion 45 in the form of a flange bearing against the lower edge of the slab 16. Each of these conductors also has a portion 46 offset forwardly from the face of the slab 16. Corresponding to the lower conductors, a set of upper conductors 50, 51, 52 and 53 is provided, the upper conductors being separated from the lower conductors by the barrier 31. As shown in Figure 2, each upper conductor is preferably U shaped and extends around the upper edge of the slab 16. One arm 55 of each upper conductor bears against the front face of the slab 16, the other arm 56 bearing against the rear face of the slab 16. The rear arm 56 has an extension 57 projecting below the end of the front arm 55.

The lower conductors may be secured to the base 16 by any suitable means. As shown, each lower conductor is provided with a bolt 60 passing from rear to front through the slab 16 and through the portion of the conductor which is against the front face of the slab. This bolt may act as a binding post as well as serving to secure the conductor to the slab. Loosely mounted on the bolt 60, I may employ a connecting lug 61, this lug being longitudinally split as at 62 for the greater part of its length. The lug 61 is also provided with a screw-threaded bore 63 at right angles to the bolt 60. The lug 61 is preferably made of a metal which is sufficiently harder than the copper commonly employed in electric wires to be able to cut a screw thread on a wire which is of suitable size corresponding to the bore 63. Thus, when it is desired to connect a wire to one of the lower conductors of the test-block, a lug 61 is screwed onto the end of the wire, cutting a screw thread thereon. The lug is then placed in position on the bolt 60 and a nut 65 is then screwed onto the bolt 60, this nut pressing together the jaws of the lug formed by the slot 62 so that the threaded portion of the wire which is between the jaws in the bore 63 is firmly clamped therein. The nut 65 also serves to clamp the lower conductor firmly in place against the front face of the base 16.

The arms 55 and 56 of each upper conductor are provided with holes in line with a corresponding hole through the base 16. This hole is preferably of a suitable size to receive freely an end portion 66 of a wire leading to the meter. In order to make a connection between the wire and the upper conductor, a nut 70 of sufficiently hard metal is screwed onto the end portion 66 so as to cut a screw thread thereon. This threaded portion is then thrust through the alined holes in the arms 55 and 56 and the base 16, and a second nut 71 is screwed onto the forwardly projecting threaded end 66. Thus the arms 55 and 56 are clamped tightly against the faces of the slab 16 by the nuts 70 and 71. This structure not only affords a strong and rigid connection between the upper conductor and the slab 16, but also provides an excellent electrical connection between the upper conductor and the end portion 66 of the wire leading from the meter. In order to hold the upper conductors in place on the base 16 when the meter wires are not connected thereto, suitable screws 72 may be provided, the base being tapped to receive these screws.

Between each upper conductor and its corresponding lower conductor, I provide a bridging conductor or switching element, which, as shown, may be in the form of a bolt 75. This bolt passes loosely through a hole in the offset portion 46 of a lower conductor and through a hole in the base 16 alined therewith. The rearward end of the bolt 75 is normally in screw-threaded connection with the extension 57 of the corresponding upper conductor so that it electrically connects its corresponding upper and lower conductors, and also clamps the extension 57 against the rear face of the base 16. In testing meters, it is customary to provide jumpers or the like for temporarily by-passing the load current around the meter so that the test may be conducted without interrupting the service to the consumer. When these jumpers or by-passing connectors have been attached, the meter 15 is then disconnected by backing off the switching elements 75 until their connection with the corresponding extensions 57 is broken. Since at such times the bulk of the load current is carried by the by-passing conductors, there is little tendency to arc when the switching elements 75 break their connections with the upper conductors. However, it may be necessary in emergencies to break the connection between a switching element 75 and its corresponding upper conductor when these parts are carrying a heavy load current. Since the switching element necessarily moves slowly in an axial direction by reason of the screw thread, an alternating current of ordinary service voltage is broken with little or no arc. It is evident, however, from Figure 2, that if such arc occurs, it must occur in a confined cavity formed by the hole through the extension 57 ordinarily filled by the rearward end of the bolt 75. Furthermore, such arc will occur at a point immediately adjacent to vulcanized fiber which, as hereinbefore stated, has the property of emitting arc-quenching gases when strongly heated. Thus an arc formed at the forward face of the extension 57 would strongly heat the adjacent vulcanized fiber so that a puff or explosion of arc-quenching gas would thereupon be generated so as to blow out the arc. By means of the structure thus described, arcs become self-quenching.

As ordinarily connected, line wires lead to the conductors 40 and 41, the load wires being connected to the conductors 43 and 42. As test blocks of this kind are adapted to carry large currents, that is, of the order of 100 amperes, it is desirable to employ jumpers having a considerable area of cross-section to carry the by-passing current while the test is being made. To this end, a by-passing conductor, such as is illustrated in Figure 5, may be employed. This consists of a piece 80 of heavy copper having a pair of notches 81 suitably spaced to receive the bolts 60 which hold down the conductors 41 and 42, these conductors being of similar potential. In order to clamp the member 80 in place, the bolts 60 for the conductors 41 and 42 may carry extra nuts 82 so that the member 80 may be clamped between them and the nuts 65. To facilitate manipulation of the member 80, a convenient handle 85 may be provided as shown. During a test, it is likewise desirable to connect temporarily the conductor 40 with the conductor 43. To facilitate such connection, I may provide a branch conductor 86 connected to the conductor 40 and secured to the base 16 by a bolt 87 and nut 88. Suitably spaced from the conductor 86 is a second conductor 90 secured to the base by a bolt 91 and a nut 92. Between the head of the bolt 91 and the rear face of the base 16 is clamped a copper bar 95, which, as shown in Figure 3, extends behind the base 16 to the bolt 60 which secures the conductor 43 to the base. The bar 95 thus serves as a permanent electrical connection between the conductor 90 and the conductor 43. In preparing for a test, a bridging conductor 80 may be clamped to the conductors 86 and 90, thus effectively connecting the conductors 40 and 43. When these conductors have been thus connected, and the conductors 41 and 42 have been connected, the four bolts 75 may be backed off sufficiently to break the connections between the lower conductors and the upper conductors so that the meter 15 is entirely disconnected from the line and load wires and is thus ready to be connected to a known load for testing purposes.

I claim:—

1. A meter test-block comprising a base consisting of a slab of insulating material, a plurality of transverse insulating barriers on said base, each said barrier consisting of a plate having a slot therethrough adapted to receive said base with a driving fit, and conductors mounted on said base for connection with line, load and meter leads, conductors of different polarities being separated by said barriers.

2. A meter test-block comprising a base consisting of a slab of vulcanized fiber, a set of conductors having end portions against the rear face of said base, a corresponding set of conductors on the front face of said base having end portions spaced therefrom, switching means comprising a set of bolts projecting loosely through the end portions of the conductors on the front face of the base and through said base and in threaded engagement with the end portions of respective conductors against the rear face of the base, and means on each said conductor for connecting a wire thereto.

3. A meter test-block comprising a base consisting of a slab of vulcanized fiber, a conductor secured against the front face of said slab, the lower end portion of said conductor having a flange engaging the bottom edge of said slab, the upper end portion of said conductor being forwardly offset away from the face of said slab, a second conductor mounted against the rear face of said slab and having a portion in line with the offset portion of the first conductor, switching means comprising a connecting bolt passing loosely through said offset portion and said slab and in threaded engagement with said second conductor, and means on each said conductor for connecting a wire thereto.

4. A meter test-block comprising a base consisting of a slab of insulating material, an upper conductor having a U shape fitting over the top edge of said slab so that the arms of the U rest against the front and rear faces of said slab, the arm against the rear face having an extension lower than the end of the other arm, a meter lead passing through both said arms and the slab between them, a pair of nuts screw-threaded on said meter lead and bearing respectively against the mutually remote faces of said arms, a lower conductor mounted against the front face of said slab and having a forwardly offset portion, and a bolt extending loosely through said offset portion and said slab and in threaded engagement with the exterior on said upper conductor, said bolt having a head bearing against said offset portion.

5. An electrical device comprising an insulating base, conductors on the front and rear faces respectively of said base, an accessible switching element passing loosely through one said conductor and the base and in threaded engagement with the other said conductor, said switching element having a head bearing on said one conductor to clamp said conductors against the base.

6. In a meter test-block, an insulating base including a slab of vulcanized fiber having apertures therethrough, a set of conductors on one side of said base, a set of corresponding conductors on the opposite side of said base, and switching means extending through said apertures and respective pairs of corresponding conductors to effect threaded clamped relation between corresponding conductors, said switching means being accessible and operable to break engagement between corresponding conductors within said apertures.

7. In a meter test-block, a slab of vulcanized fiber, a conductor against the rear face of said slab, a second conductor having a portion forwardly offset from the front face of said slab, said conductors and slab having alined holes therethrough, and a switching element extending through said alined holes so as to connect said conductors electrically, said switching element being movable forwardly to break contact with the rear conductor in a cavity formed by said holes through the rear conductor and the slab.

8. In a meter test-block, a base consisting of a slab of vulcanized fiber, a pair of separate conductors mounted on said block, a switching element extending through said slab and normally engaging one of said conductors in front of said slab and the other said conductor behind said slab, said switching element being movable to break the connection at a point in a confined area and immediately adjacent to a portion of said slab, whereby any arc which may occur at the break is self-quenching.

ERNEST G. JOHANSSON.